(12) United States Patent
Moiseev et al.

(10) Patent No.: US 9,178,892 B2
(45) Date of Patent: *Nov. 3, 2015

(54) SYSTEM AND METHOD FOR MANAGING ACCESS TO COMPUTER RESOURCES

(71) Applicant: Kaspersky Lab ZAO, Moscow (RU)

(72) Inventors: Stanislav V. Moiseev, Moscow (RU); Mikhail A. Ershov, Moscow (RU)

(73) Assignee: AO Kaspersky Lab, Moscow (RU)

( * ) Notice: Subject to any disclaimer, the term of this patent is extended or adjusted under 35 U.S.C. 154(b) by 0 days.

This patent is subject to a terminal disclaimer.

(21) Appl. No.: 14/661,452

(22) Filed: Mar. 18, 2015

(65) Prior Publication Data

US 2015/0195283 A1 Jul. 9, 2015

Related U.S. Application Data

(63) Continuation of application No. 14/247,387, filed on Apr. 8, 2014, now Pat. No. 9,015,797.

(30) Foreign Application Priority Data

Dec. 27, 2013 (RU) ................................ 2013158129

(51) Int. Cl.
- *H04L 29/06* (2006.01)
- *H04L 12/911* (2013.01)
- *G06F 21/62* (2013.01)

(52) U.S. Cl.
CPC .............. *H04L 63/10* (2013.01); *G06F 21/629* (2013.01); *H04L 47/78* (2013.01); *H04L 63/20* (2013.01); *G06F 2221/0735* (2013.01)

(58) Field of Classification Search
CPC ......... G06F 21/62; G06F 21/60; H04L 63/10; H04L 47/78; H04W 12/00
See application file for complete search history.

(56) References Cited

U.S. PATENT DOCUMENTS

| | | | |
|---|---|---|---|
| 7,698,731 B2 | 4/2010 | Johnson et al. | |
| 8,479,256 B2 | 7/2013 | Riel et al. | |
| 8,572,729 B1 | 10/2013 | Lowe et al. | |
| 2003/0014521 A1 | 1/2003 | Elson et al. | |
| 2011/0047613 A1 | 2/2011 | Walsh | |
| 2013/0283368 A1 | 10/2013 | Waddington et al. | |
| 2014/0150066 A1* | 5/2014 | Chandolu ........... G06F 21/6218 726/4 |

* cited by examiner

*Primary Examiner* — Izunna Okeke
(74) *Attorney, Agent, or Firm* — Arent Fox LLP; Michael Fainberg

(57) ABSTRACT

Disclosed are methods, systems, and computer program are provided for managing access to computer resources. An example method includes receiving a request, from a client process, for performing an operation on a computer resource, including receiving the request by a kernel of an operating system for creating a separate process to perform the requested operation on the computer resource; obtaining, by a resource manager, metadata of the computer resource, security policies for the client process to perform the requested operation on the computer resource, and data relating to operations requested by other client processes on the computer resource; and performing the requested operation on the resource upon detecting that the requested operation does not: alter the metadata, violate an isolation condition of the computer resource, violate rights of the client process, and distort the operations requested by the other client processes.

20 Claims, 4 Drawing Sheets

SYSTEM AND METHOD FOR MANAGING ACCESS TO COMPUTER RESOURCES

CROSS-REFERENCE TO RELATED APPLICATIONS

This application is a continuation of U.S. application Ser. No. 14/247,387 filed on Apr. 8, 2014, which claims benefit of priority under 35 U.S.C. 119(a)-(d) to a Russian Application No. 2013158129 filed on Dec. 27, 2013, both of which are incorporated by reference herein.

TECHNICAL FIELD

The present disclosure relates generally to the field of computer resource management, and more specifically, to systems and methods of isolating computer resources using a resource manager.

BACKGROUND

In modern operating systems, access to resources (such as data stored in the working memory or obtainable through sockets, files on the hard disk, and so on) may occur in parallel or sequentially by one or more clients, where the clients are applications working with the resources. Very often the characteristics of the resources (such as the location of data in memory, accessible information transfer ports, and so on) are merely of an informational nature and have little impact on data operations by these resources, and the clients performing operations on them are not aware of the current condition of the resources or the operations of other clients with the resources.

As a result of such an organization of the working with resources, their security, that is, the confidentiality and veracity of the data stored in them cannot be guaranteed to the necessary extent.

One of the most common examples of illegitimate alterations of data in resources are instances when, due to mistakes in a program or due to malicious actions when writing into one memory sector, data located in adjacent memory sectors is damaged or altered. This may be one way in which malicious software works that exploits vulnerabilities of buffer overflow. In the best case, this results in incorrect working of the vulnerable program; in the worst case, it affects the working of other applications and the operating system as a whole (for example, hackers may obtain administrator rights to perform certain actions on the victim's computer or obtain access to his confidential data).

Yet another frequent example of data damage is the situation where one client writes data into a resource from which a second client is reading data at the same time. In such an unsynchronized working of the two clients, who often do not know about the actions of each other, a reading of damaged information may occur—the first client requested the data prior to the time of its being changed by the second client, but received it only after the changes, thereby not receiving the data that it was expecting.

Modern operating systems in general and software in particular may be protected against the above-described situations by introducing restrictions on working with data, such as security policies, a system of operation transactions, setting clear boundaries on the domains of resources and verifying that the clients do not cross these boundaries, and so on. Unfortunately, the above-described methods are only a partial solution. For example, by limiting access to a single resource, operating systems may ignore calls for their components, i.e., the subresources making up a resource for example, an array in the working memory is a set of pages of working memory, a file on a hard disk is a set of hard disk clusters, an application is a collection of sections, and so on). As a result, by adding new information to the end of a file it is not possible to damage a file located next to it on the disk, but one may obtain access to the hard disk and write data by clusters, which may result in damaging of information in adjacent files. Or, if reading of a file is forbidden based on security policies, one may still obtain information about it by consulting the clusters of the hard disk in which clusters the necessary information is written. Oftentimes, given a good organization of the system for protection of resources when different applications are working, the operating system affords little protection for the resources when one or more processes of the same application are working, since all of its components have equal rights when accessing the resources. As a result, in the course of the working of a single application there may occur desynchronization during reading and writing to the same resource, accidental writing to adjacent resources, and so on.

To solve the above-described problems, one may make use of so-called object or resource managers—modules of applications or of the operating system that alone may work directly with the resources, ensuring their isolation from each other, while other clients need to contact the resource managers to work with the resources. The benefit of such an organizing of the working with data is the possibility of avoiding the bulk of the aforementioned problems. But the drawback is that, when mistakes occur in the working of the resource manager or if it is cracked by malware, the security of the data (not only that used by a specific application, but in general data with which the given resource manager is working) can in no way be guaranteed.

To ensure a greater security of data storage, on the one hand one must isolate resources from each other and from clients working with them, monitor current operations on resources to disallow the use of "busy" resources, and control the confidentiality of resources so that unverified clients cannot access them, and on the other hand protect as much as possible the system components working directly with the resources (against actions from the outside and mistakes from the inside).

SUMMARY

Disclosed are systems, methods and computer program products for managing access to computer resources. In one aspect, an example method includes receiving a request, from a client process, for performing an operation on a computer resource, including receiving the request by a kernel of an operating system for creating a separate process to perform the requested operation on the computer resource; obtaining, by a resource manager, metadata of the computer resource, security policies for the client process to perform the requested operation on the computer resource, and data relating to operations requested by other client processes on the computer resource; and performing the requested operation on the resource upon detecting that the requested operation does not: alter the metadata, violate an isolation condition of the computer resource, violate rights of the client process, and distort the operations requested by the other client processes.

In another example aspect, the method further comprises determining, based on the metadata, whether the requested operation alters the metadata and violates the isolation condition of the computer resource; determining, based on the security policies, whether the requested operation violates the rights of the client process; and determining, based on the data relating to the operations requested by the other client processes, whether the requested operation distorts the operations requested by the other client processes.

In another example aspect, the metadata comprise at least one of a first range of location on an data medium, a second range of location in a memory, an identifier, a name, integrity data, reservation data, and data on execution methods of the resource.

In another example aspect, the data comprise at least one of a start time of the other operations, a current status of the other operations, a current type of the operations, and communications between the other client processes.

In another example aspect, the isolation condition is related to isolating the computer resource from other resources and client processes.

In another example aspect, the method further comprises storing an application on a disk in a set of logically isolated sections, at least a portion of the isolated sections comprising computer resources.

In another example aspect, the method further comprises providing multiple resource managers to manage the computer resources independently.

In another aspect, an example system for managing access to computer resources includes a processor configured to: receive a request, from a client process, for performing an operation on a computer resource, including receiving the request by a kernel of an operating system for creating a separate process to perform the requested operation on the computer resource; obtain, by a resource manager, metadata of the computer resource, security policies for the client process to perform the requested operation on the computer resource, and data relating to operations requested by other client processes on the computer resource; and perform the requested operation on the resource upon detecting that the requested operation does not: after the metadata, violate an isolation condition of the computer resource, violate rights of the client process, and distort the operations requested by the other client processes.

In another aspect, an example non-transitory computer-readable storage medium having a computer program product stored thereon, the computer program product comprising computer-executable instructions for managing access to computer resources, the instructions configured for: receiving a request, from a client process, for performing an operation on a computer resource, including receiving the request by a kernel of an operating system for creating a separate process to perform the requested operation on the computer resource; obtaining, by a resource manager, metadata of the computer resource, security policies for the client process to perform the requested operation on the computer resource, and data relating to operations requested by other client processes on the computer resource; and performing the requested operation on the resource upon detecting that the requested operation does not: alter the metadata, violate an isolation condition of the computer resource, violate rights of the client process, and distort the operations requested by the other client processes.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and particularly pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Example aspects are described herein in the context of a system, method and computer program product for isolating resources from each other and from the software that is working with them. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

The present disclosure provides an operating system component, hereinafter called the resource manager, which may have any combination of the following attributes:

a single module of the operating system having the ability to work directly with resources of a chosen type;

a separate resource manager is required for each particular type of resource;

if a resource of one type is compound and contains resources of other types, then to work with the latter the resource manager of the first type needs to use resource managers of the corresponding types;

it contains the minimum possible and necessary set of confidential tools to work with the resources, first and foremost including support for the isolation of the resources (to prevent the possibility of malfunctioning or the exploiting of vulnerabilities by malware, resulting in possible access to adjacent resources);

all operations with resources take place in individual processes;

the resource manager is divided into a control part and a functional part, working in separate processes;

all clients wanting to perform operations on the resource must apply to the resource manager.

Such a form of organizing the working of clients with resources may be the safest in terms of the integrity and confidentiality of the information being kept in the resources.

The present disclosure makes it possible to solve the problem of heightening the security of working with resources in an operating system by isolating them from other resources and clients, and also by a rigorous control of the access to them, including the case when nonconfidential components of a resource manager contain mistakes or have been compromised.

Figure 1:
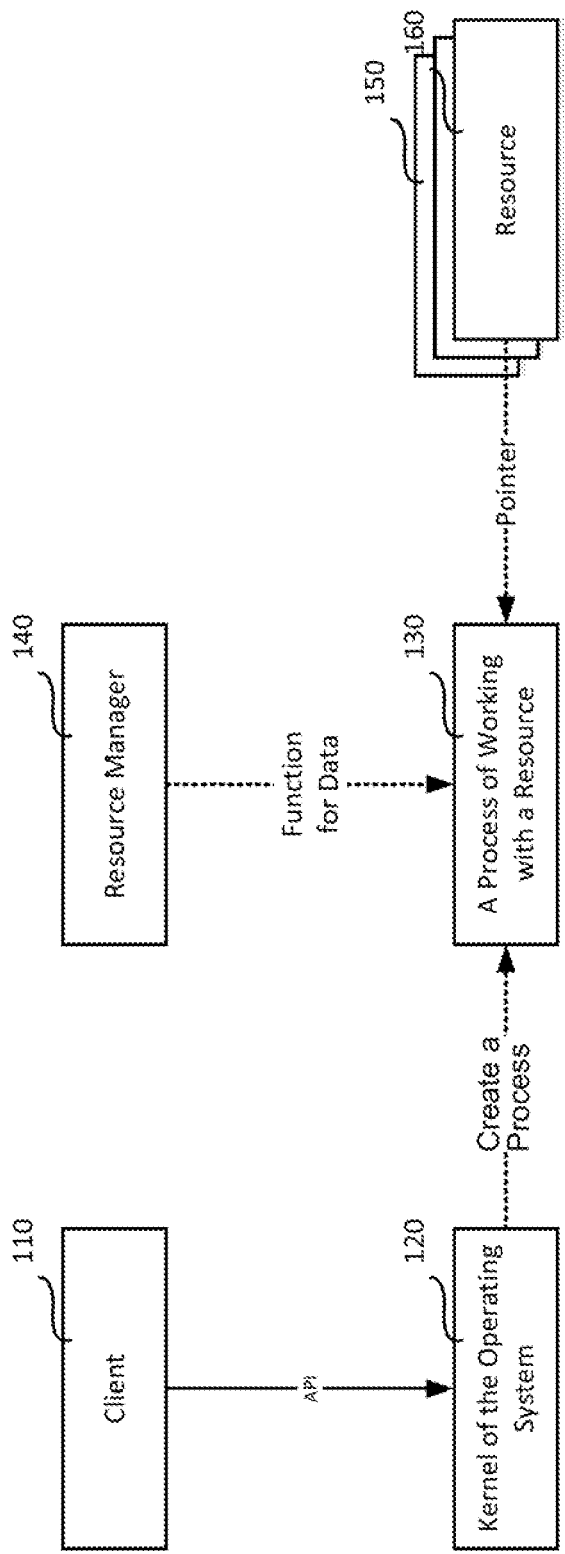
FIG. 1 shows a structural diagram of an example system for the interaction of a client with a resource using a resource manager.

FIG. 1 shows a structural diagram of an example system for the interaction of a client with a resource by using a resource manager. The system for interaction of a client with a resource by using a resource manager includes a client 110, a kernel of the operating system 120, a process of working with a resource 130, a resource manager 140, a storage module 150 of the resources served by the given resource manager 140, and a resource 160 which is part of the resource storage module 150 and is necessary for the work of the client 110.

The client 110 is a process that uses in its working data which is being kept in the resource 160. The client 110 sends a request (for example, by using Application Programming interface (API)) to the kernel of the operating system 120 to be granted access to the selected resource 160 in order to perform operations (such as reading, writing, and so on) on the data being kept there or to the resource storage module 150 for operations (such as search, creation, deletion, and so on) on the resource itself. Depending on whether the given operation is allowed by the resource manager 130 at the given time on the selected resource for the given client, the kernel of the operating system 120 provides access to the resource 160 or returns a denial.

The kernel of the operating system 120 is the central part of the operating system, providing applications with a coordinated access to the computer resources, such as processor time, memory, external hardware, and external data input and output.

The kernel of the operating system 120 receives from the client 110 a request (for example, by using API) to provide access to the selected resource 160. After this, the kernel of the operating system creates a separate process for working with the resources 130, to which it transmits the data received from the client 110 (such as an indicator of the memory address where the information will be written, or the name and position in a file from which information will be read), and also an identifier of the resource to perform a search for the resource 160 among the resources of the same type 150 or a descriptor of the resource and an indicator of the resource's data, if the resource has already been found, and indicates precisely which functions of the resource manager 140 are required to perform the operations requested by the client on the resource and will be used to process the data transmitted by the client 110. After the process of working with the resources 130 is completed, the kernel of the operating system 120 will return the results of its work to the client 110.

The process of working with the resources 130 is designed to obtain from the kernel of the operating system 120 the data of the client 110 for operations on the resource 160, from the resource storage module 150 an indicator for the required resource 160, and from the resource manager 140 the functions of data processing of the resource manager 140, the performance of the required operations by the data processing functions of the resource manager, and the outputting of the results of the operation performed to the kernel of the operating system 120.

The process of working with the resources 130 is created by the kernel of the operating system 120 on the basis of the actual request of the client 110 to said kernel to carry out a specific operation of the client 110 on the data of the resource 160 and it is eliminated after performance of the required operations and outputting of the results to the kernel of the operating system 120. This reduces the chance of malicious code getting into the algorithm of the operation, and thereby heightens the security of each individual operation of the client 110 on the resource 160. The data obtained from the client 110 and transmitted by the kernel 120 is used to construct a call for the necessary functions of the resource manager 140 (which may be either a single operation, such as the removal of a resource of "file" type with iD="C:\file.dat", or a group of operations, such as a duplication of buffer memory with ID=1004, consisting of searching for a resource #1, creating a resource #2, reading of resource #1 and writing into resource #2). Furthermore, the functions of working with the resource itself (such as searching for the resource, creation or deletion) and the functions of working with the contents of the resource (such as reading and writing) may be initiated as separate processes for greater security, thereby preventing malicious code from getting into them.

The resource manager 140 is designed to receive requests from the kernel of the operating system 120 for access to data needed by the client 110 and being kept in the resource 160, to check whether it is permissible to provide such access, to provide access to the requested resource or to issue a denial.

The resource manager 140 provides only part of its functional to the process of working with the resources 130, thereby protecting the remaining parts from a possible malfunction or hacking by malware.

The resource storage module 150 is designed to store resources 160 of the same type, to do a search and to provide access to them for the resource manager 140.

The resource storage module 150 may include:
working memory, containing as its resources 160 data arrays and information about them (for example, size and location in memory);
a file system, containing as its resources 160 files and information about them;
a gallery of images, which is part of the file system and contains as its resources 160 files storing images (such as bmp, png, jpg and so on).
a database, containing as its resources 160 tables of data.

The resource storage module 150 contains all the information that is sufficient for the resource manager 140 to perform a search for the needed resource from the unique identifier transmitted to it (for example, the file system NTFS has the MFT—Master File Table, containing the names of all the files, their size and location on the disk, and upon receiving the name of a file the file system can perform a search for it from this data).

The resource 160 is designed to store information entered into it by the resource manager 140, and to present it to the latter on demand.

The resource 160 may include:
objects in the working memory (such as data arrays);
files;
ports.

As an example describing this scheme of operation, consider the reading by a graphic editor, such as MS Paint, of the file "c:\my_images\background.jpg", containing an image, into an allocated memory sector for subsequent display and editing.

The client 110 through API functions applies to the kernel of the operating system 120 with a request to open the file "c:\my_images\background.jpg" for reading (including a search for the file in the file system and a presentation of its descriptor). The kernel of the operating system 120 creates a new process 130, from which the function of the file resource manager 140 will be called up to search for the file with the name indicated by the client 110. The file resource manager 140 by its function performs a search for the needed file among the full set of files of the file system; if successful, it obtains its parameters (such as location on the hard disk, size, and so on) and presents this data if necessary to the kernel of the operating system 120, which in turn registers the resource in the system for later processing and presents its descriptor to the client 110. After this, the process 130 is finished. Having the descriptor of the file and the file size obtained from this, the client 110 through API functions addresses the kernel of the operating system 120 with a request to create a buffer in memory with a size equal to the size of the file. The kernel of the operating system 120 creates a new process 130, from which the function of the memory resource manager 140 will be called up to create a new buffer. The memory resource manager 140 through its function performs an analysis of the free space in working memory, allocates (that is, determines the address for the beginning and end of the buffer so that the buffer does not overlap other objects in memory) the memory sector of requested size, and if necessary provides data on the buffer to the kernel of the operating system 120, which in turn registers (for later processing) the resource in the system and presents its descriptor to the client 110. After this, the process 130 is finished. The client 110, having in its hands the descriptors for the file being read and the buffer where the file should be read into, addresses the kernel of the operating system 120 through API functions with a request to read the file content into the buffer. The kernel of the operating system 120 creates a new process 130, from which the function of the file resource manager 140 will be called up to read the file into memory. The file resource manager in one way or another reads the data and transfers it to the memory resource manager for proper placement in the allocated buffer. After completing the operation, the result of the operation is returned to the client 110. After this, the process 130 is finished.

Figure 2:
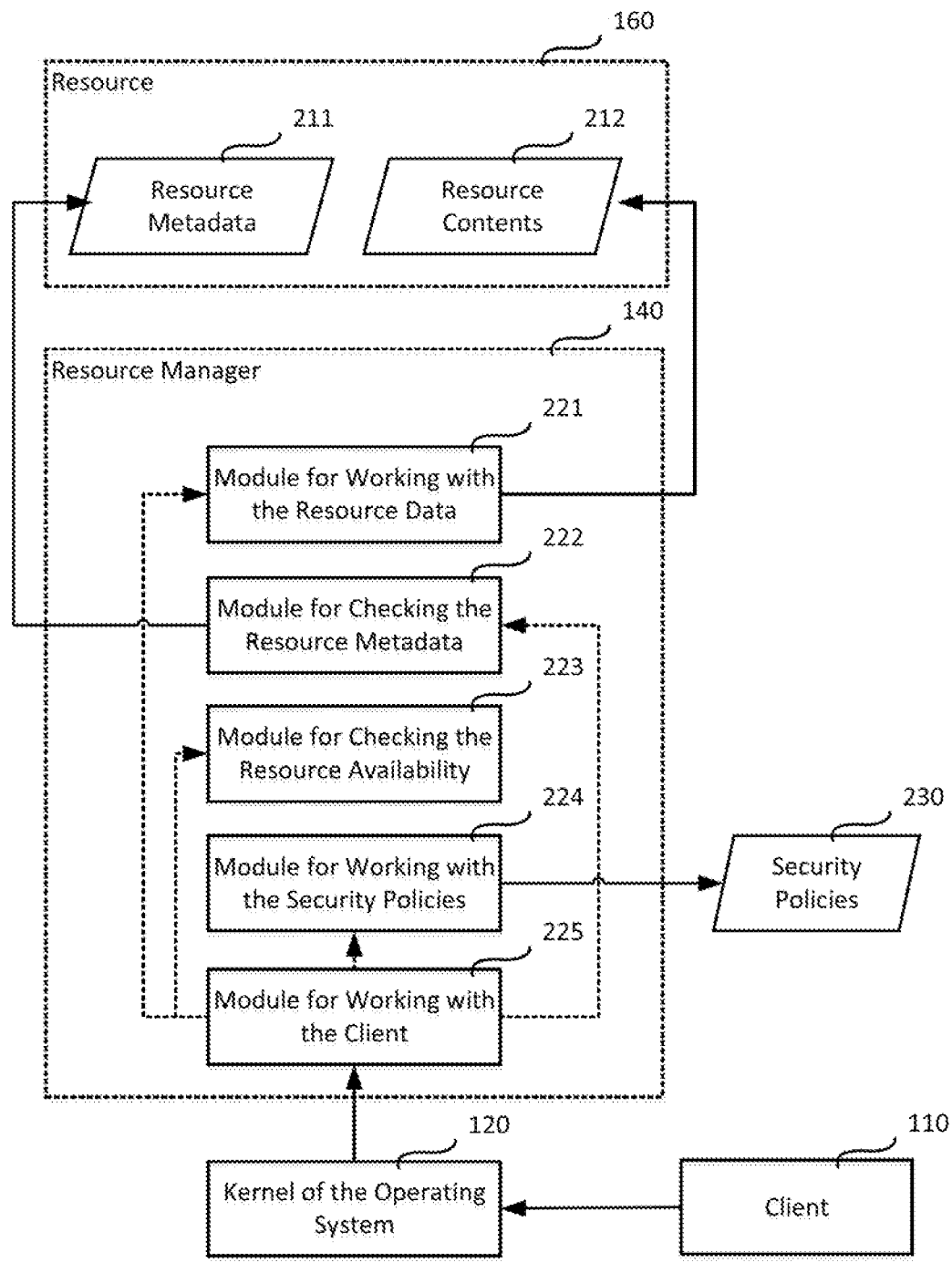
FIG. 2 shows a structural diagram of examples of a resource device, a resource manager, and a system for the working of the resource manager.

FIG. 2 shows the structural diagram of the resource device, the resource manager, and the system for the interaction of the client with the resource by using the resource manager.

The system for interaction of the client with the resource by using the resource manager includes the client 110, the kernel of the operating system 120, the security policies 230, the resource manager 140 and the resource 160.

The resource 160 is a computer resource that includes the resource metadata 211 and the resource contents 212. The resource metadata may include:
 an identifier—a unique ID by which the resource can be identified unambiguously in a listing of all available resources of a given type;
 a name;
 integrity data (such as hash sums calculated from resource data);
 reservation information;
 information on the execution methods of the resource;
 information for location on an information medium (such as the ID of hard disk clusters, CD/DVD/Blu-Ray tracks);
 the range of location in memory (such as the range of addresses of memory locations in which data can be found, beyond which the data is not permitted in any case).

In one aspect, the resource manager 140 includes module for working with the resource data 221, module for checking the resource metadata 222, module for checking the resource availability 223, module for working with the security policies 224 and module for working with the client 225.

The module for working with the resource data 221 is configured to receive a request from the module for working with the client 225 to carry out operations such as reading, writing, and so forth, on the resource contents 212, and also operations such as search, creation, deletion, and so forth, on the resource 160 itself, to perform the required operations and to transmit the result of performing the operations to the module for working with the client 225 for further processing.

The module for checking the resource metadata 222 is configured to obtain resource metadata 211 from the resource 160, to make a decision on the permissibility of performing the operations with the resource as requested by the client 110 with such conditions that the changes do not contradict the resource metadata (for example, working only with a specified port or writing only into selected memory sectors), and to transmit the result of performing the operations to the module for working with the client 225 for further processing.

The module for checking on availability of the resource 223 is configured to obtain information on the current operations of other clients with the resource 160, to make a decision on the permissibility of performing operations on the resource 160 as requested by the client 110 with such conditions that these operations do not distort data from the resource 110 with which another client is performing other operations at the same time (e.g., do not result in altering the metadata and violating an isolation condition of the resource), and to transmit the result of performing the operations to the module for working with the client 225 for further processing. For example, in one aspect, the module for checking on availability of the resource 223 determines, based on the data about the other operations requested by the other clients, whether the operations requested by the client result in distorting results of the other operations requested by the other clients.

The module for working with security policies 224 is configured to request security policies 230 from the system to carry out the operations requested by the client 110 on the resource 160 (for example, is it permitted for the application archiver.exe, initiated in the name of the user ordinary_user, to perform a reading of the file degree_work.docx, to write data into the file stuff.arc, or, for example, is it permitted for the service monitor.srv, initiated in the name of the user admin, to perform a reading of 100 kB of data from memory, located at address 0x20000000-0x20019000), to make a decision on the permissibility of performing such operations (e.g., whether the requested operations result in violating rights of the client that requested the operations on the resource), and to transmit the result of performing the operations to the module for working with the client 225 for further processing.

The module for working with the client 225 is configured to receive from the kernel of the operating system 120 a request to perform operations of the client 110 on a resource 160, to prepare and transmit data in succession to the module for working with security policies 224, to the module for checking the availability of the resource 223, to the module for checking of resource metadata 222 and finally to the module for working with resource data 221 for their processing, to receive the results from the aforementioned modules of the resource manager, to format and transmit the results to the kernel of the operating system 120. The sequence of communication between the module for working with the client 225 and the other modules of the resource manager 140, except for the module of working with the resource data 221 (since the operations on the resource are in fact performed by it) may vary depending on the type of resource, the implementation, and so forth, in order to increase the security of the resource manager, the speed of performance of the operations, and so forth (for example, sometimes the checking of the security policies may be done later than the checking of the resource metadata).

The resource manager 140 receives a request from the kernel of the operating system 120 to perform certain operations of the client 110 on the resource 160. This request goes to the module for working with the client 225.

The module for working with the client 225 receives the request from the kernel of the operating system 120, prepares the received data (for example, it breaks down a compound request into several simple ones) for further processing by other modules of the resource manager 140, after which it proceeds further in accordance with its own working logic and the goals placed on the given module. In one aspect, the module for working with the client 225 sends the request to the module for working with the security policies 224. If the module for working with the security policies 224 issues a denial, the module for working with the client 225 sends to the kernel of the operating system 120 a refusal to perform the requested operation, otherwise it relays the request to the module for checking on availability of the resource 223. If the module for checking the availability of the resource 223 issues a denial, the module for working with the client 225 sends to the kernel of the operating system 120 a refusal to perform the requested operation, otherwise it relays the request to the module for checking the resource metadata 222. If the module for checking the resource metadata 222 issues a denial, the module for working with the client 225 sends to the kernel of the operating system 120 a refusal to perform the requested operation, otherwise it relays the request to the module for working with resource data 221 to perform the operation requested by the client 110. The result of performing the operation on the resource is sent by the module for working with the client 225 to the kernel of the operating system 120.

Accordingly, in these aspects, the module for working with resource data 221 performs the requested operations on the resource when the requested operations do not result in altering the metadata or violating the isolation of the resource by the requested operations, do not result in violating the rights of the client, and do not result in distorting the results of the other operations requested by the other clients.

In these aspects, the functions of the resource manager that are required to perform the requested operations may include different functions that are not related to each other, and a separate process may be created by the kernel of the operating system to perform the operations. The separate process may include different processes that execute the different functions.

In these aspects, the metadata may include at least one of a first range of location on an data medium, a second range of location in a memory, an identifier, a name, integrity data, reservation data, and data on execution methods of the resource. Also, in these aspects, the data about the other operations of the other clients may include at least one of a start time of the other operations, a current status of the other operations, a current type of the other operations, and communications between the other clients. Further, in these aspects, the isolation condition may be related to isolating the computer resource from other resources and clients.

The module for working with the security policies 224 receives a request from the module for working with the client 225 to perform an analysis as to whether the operation on the resource 160 as requested by the client 110 meets the security policy, requests and receives from the system the necessary security policy 130, makes a decision on the permissibility of performing the requested operation, and sends the obtained result to the module for working with the client 225.

The module for checking the availability of the resource 223 receives a request from the module for working with the client 225 to perform an analysis as to the permissibility of performing the operations on the resource 160 as requested by the client 110 with such conditions that these operations do not distort data from the resource 110 with which another client is performing its operations at the same time. Then, on the basis of information as to the current operations of clients on the resource 160, it makes a decision on the permissibility of such an operation and sends the resulting verdict to the module for working with the client 225.

To perform the check for permissibility of the operations on the resources, a queue of clients who have requested access to the resource is drawn up. Each client in the queue is assigned a priority, depending on the type of operation, the time needed to perform the operation, the rights of the client, the relations between clients applying for the same resource, the time of arrival of the request from the client, the current status of the resource, and so forth. The higher the priority, the sooner the client will be handled (performance of the operation requested by the client or issuing of a refusal). Certain operations may be performed simultaneously for several clients (for example, both clients are reading data), others may be performed only sequentially (for example, the operation of writing from one client is done only after the operation of reading from a second client).

For example, two clients simultaneously apply to a resource in the form of a file with a size of 10 MB: one client with the purpose of reading the entire file completely into memory, the other with the purpose of writing a block of 10 kB to the end of the file. The module for checking the availability of the resource 223 has made an estimate of the condition of the resource (the resource is found to be free), after which both clients are placed in a queue to perform the requested operations. Since the operation of writing the small block will be performed much more quickly than the operation of reading the entire file, the second client receives a higher priority than the first client. After this, according to schedule, the operations of client #2 (0.02 seconds) and client #1 (0.35 seconds) are performed. Thus, the overall delay for both clients is not more than 0.02 seconds.

The module for checking the resource metadata 222 receives a request from the module for working with the client 225 to perform an analysis on the permissibility of performing operations with the resource 160 as requested by the client 110 with such conditions that the changes do not contradict the metadata of the resource. After this, it obtains the resource metadata 211 from the resource 110 and performs the required analysis. The obtained result is transmitted by the module for checking the resource metadata 222 to the module for working with the client 225.

For example, when a client requests performance of the operation of writing 100 kB of data at address 0x4000 into a resource in the form of an array, the module for checking the resource metadata 222 receives from the resource 110 metadata 211 in the form of the address of the range of location of the array in memory 0x20000000-0x20010000. A check is made as to whether the data after being written will be outside the limits of the indicated range:
START_ADDRESS=0x20000000+0x4000
FINISH_ADDRESS=START_ADDRESS+
0x19000=2001D000>0x20010000

The result establishes that, if the writing were done, the data would be situated outside the boundaries of the allocated range of resource addresses. Therefore, the resource manager is sent a refusal to perform the requested operation.

The module for working with resource data 221 receives a request from the module for working with the client 225 to perform operations on the contents of the resource 212; it performs the requested operations and communicates the results to the module for working with the client 225.

Figure 3:
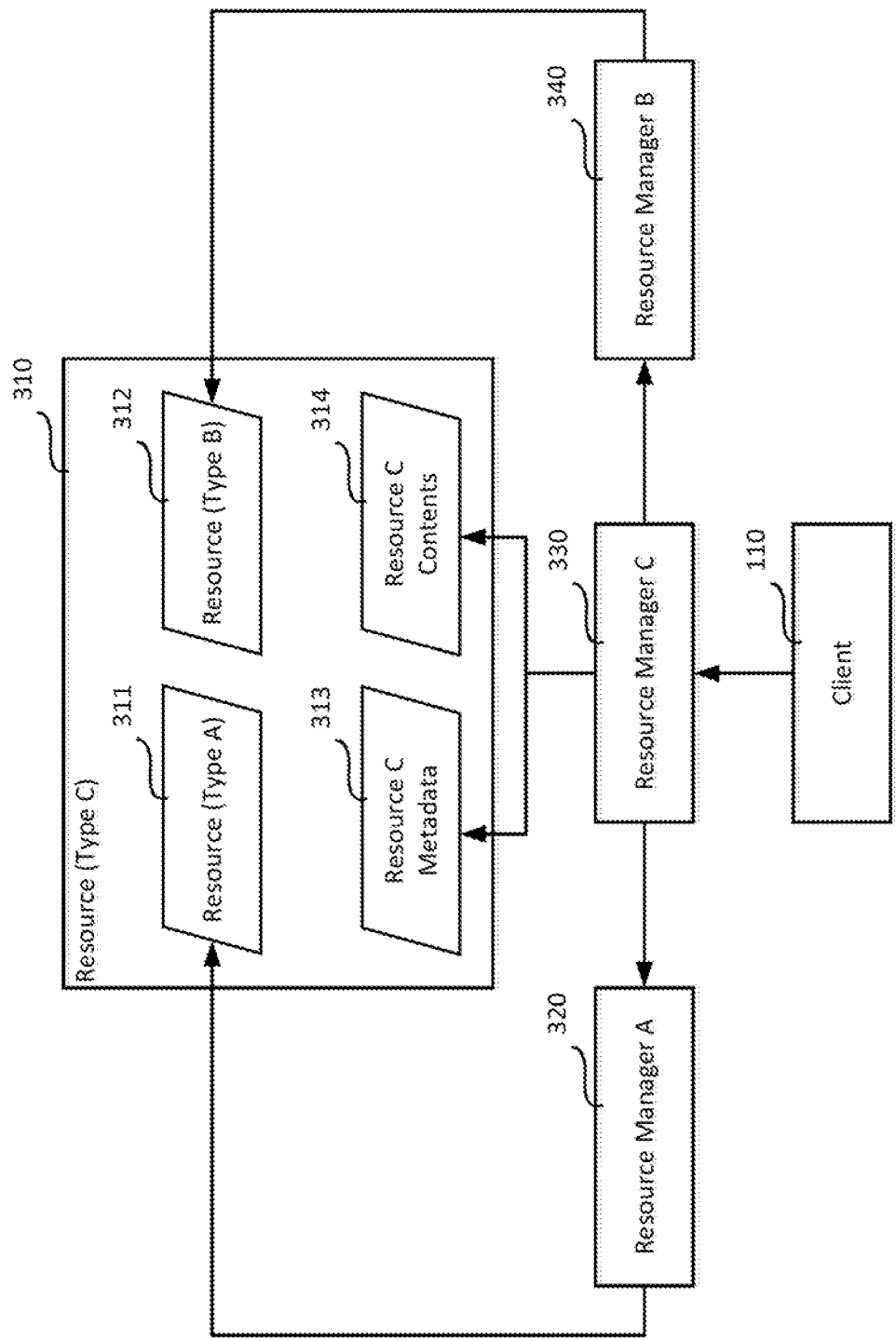
FIG. 3 shows a structural diagram for an example of the interaction between a client and a resource.

FIG. 3 shows the structural diagram for the interaction between the client and a resource which includes resources of several types.

The structural diagram of the interaction between the client and the resource which includes resources of several types includes the resource (type C) 310, the resource manager A 320, the resource manager C 330, the resource manager B 340 and the client 110.

The resource (type C) 310 is configured to store information entered into it by the resource manager C 330 and to provide the information to the latter on demand.

The resource 310 includes data being entered into resource (type A) 311, resource (type B) 312, resource C metadata 313 and resource C contents 314 not belonging either to resource (type A) or resource (type B).

For example, an application stored on disk is a set of logically isolated sections, some of which include executable code, and some of which include application resources, such as icons, images, sound fragments, and so on. In the present case, each section is a separate subresource "section" of the overall resource "application file", while the icons, images, and the like are separate subresources "application resources" of the subresource "sections". When working with one of the icons (for example, replacing the basic icon of the application with another one), the resource manager of the application file applies to the resource manager of the sections, which in turn applies to the resource manager of the icons. In this way, even if the replacement operation is done incorrectly (mistakes in writing, untrue data, and so on), this does not affect the other components of the application file and does not make the entire application inoperable.

Resource (type A) 311 is configured to store information entered into it by resource manager A 320 and to present this to the latter on demand. Resource (type B) 312 is configured to store information entered into it by resource manager B 340 and to present this to the latter on demand.

Resource manager C 330 is configured to receive requests from the client 110 for access to the data stored in resource (type C) 310, to check whether it is permissible to grant such access, and to provide access to the requested resource or issue a refusal to the client.

Resource manager C 330 receives a request from the client 110 to perform certain operations on resource (type C) 310. For operations on resource (type A) 311, which is part of resource (type C) 310, resource manager C 330 addresses a request to resource manager A 320, transmits the necessary data, and receives the results of performing the requested operations for further processing. Similarly, for operations on resource (type B) 312, which is part of resource (type C) 310, resource manager C 330 addresses a request to resource manager B 340, transmits the necessary data and receives the results of performance of the requested operations for further processing. For operations on contents of resource C 314 not pertaining either to resource (type A) or to resource (type B), the resource manager applies directly, using the resource metadata 213 as the metadata.

Resource manager A 320 is configured to receive requests from the client, in this case resource manager C 330, for access to the data stored in resource (type A) 311, to check whether it is permissible to grant such access, and to provide access to the requested resource or issue a refusal to the client. Resource manager B 340 is configured to receive requests from a client, in this case resource manager C 330, for access to data stored in resource (type B) 312, to check whether it is permissible to grant such access, and to provide access to the requested resource or issue a refusal to the client.

The client 110 sends a request (for example, by using inter-process communication) to resource manager C 330 to be granted access to a selected resource to perform a given operation on data being stored there. Depending on whether this operation is allowed at the given moment on the selected resource for the given client, resource manager C 330 will grant access to the resource (type C) 310 or return a refusal.

Figure 4:
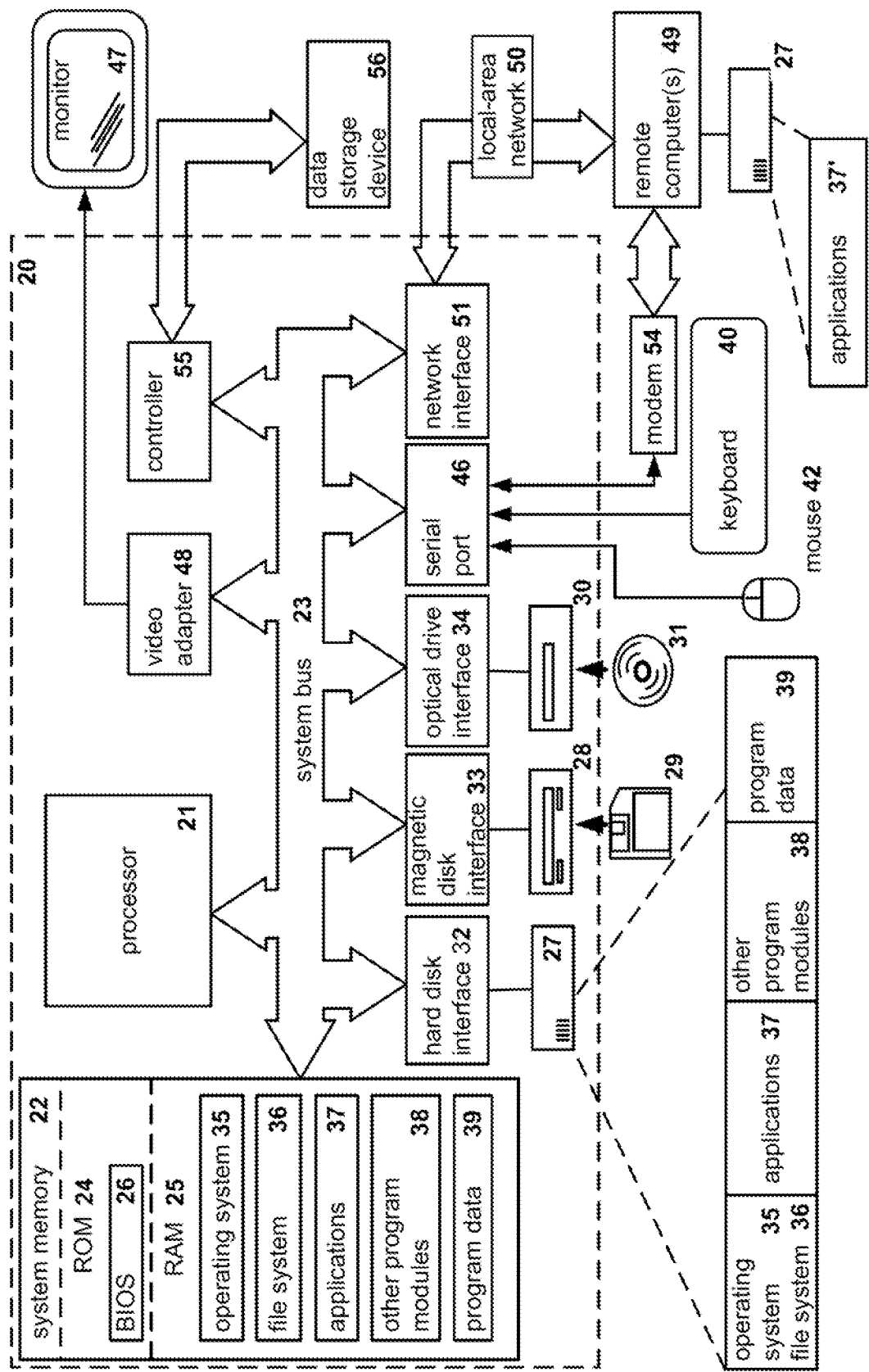
FIG. 4 shows an example of a general purpose computer system, a personal computer or a server suitable for implementing systems and methods for isolating resources from each other and from the software that is working with them.

FIG. 4 shows an example of a general-purpose computer system (which may be a personal computer or a server) 20, including a central processing unit 21, a system memory 22 and a system bus 23 connecting the various system components, including the memory associated with the central processing unit 21. The system bus 23 is realized like any bus structure known from the prior art, containing in turn a bus memory or bus memory controller, a peripheral bus and a local bus, which is able to interact with any other bus architecture. The system memory includes permanent memory (ROM) 24 and random-access memory (RAM) 25. The basic input/output system (BIOS) 26 includes the basic procedures ensuring the transfer of information between elements of the personal computer 20, such as those at the time of loading the operating system with the use of the ROM 24.

The personal computer 20, in turn, includes a hard disk 27 for reading and writing of data, a magnetic disk drive 28 for reading and writing on removable magnetic disks 29 and an optical drive 30 for reading and writing an removable optical disks 31, such as CD-ROM, DVD-ROM and other optical information media. The hard disk 27, the magnetic disk drive 28, and the optical drive 30 are connected to the system bus 23 across the hard disk interface 32, the magnetic disk interface 33 and the optical drive interface 34, respectively. The drives and the corresponding computer information media are power-independent modules for storage of computer instructions, data structures, program modules and other data of the personal computer 20.

The present disclosure provides the implementation of a system that uses a hard disk 27, a removable magnetic disk 29 and a removable optical disk 31, but it should be understood that it is possible to employ other types of computer information media 56 which are able to store data in a form readable by a computer (solid state drives, flash memory cards, digital disks, random-access memory (RAM) and so on), which are connected to the system bus 23 via the controller 55.

The computer 20 has a file system 36, where the recorded operating system 35 is kept, and also additional program applications 37, other program modules 38 and program data 39. The user is able to enter commands and information into the personal computer 20 by using input devices (keyboard 40, mouse 42). Other input devices (not shown) can be used: microphone, joystick, game controller, scanner, and so on. Such input devices usually plug into the computer system 20 through a serial port 46, which in turn is connected to the system bus, but they can be connected in other ways, for example, with the aid of a parallel port, a game port or a universal serial bus (USB). A monitor 47 or other type of display device is also connected to the system bus 23 across an interface, such as a video adapter 48. In addition to the monitor 47, the personal computer can be equipped with other peripheral output devices (not shown), such as loudspeakers, a printer, and so on.

The personal computer 20 is able to work in a network environment, using a network connection to one or more remote computers 49. The remote computer (or computers) 49 are also personal computers or servers having the majority or all of the aforementioned elements in describing the nature of a personal computer 20, as shown in FIG. 4. Other devices can also be present in the computer network, such as routers, network stations, peer devices or other network nodes.

Network connections can form a local-area computer network (LAN) 50 and a wide-area computer network (WAN). Such networks are used in corporate computer networks and internal company networks, and they generally have access to the Internet. In LAN or WAN networks, the personal computer 20 is connected to the local-area network 50 across a network adapter or network interface 51. When networks are used, the personal computer 20 can employ a modem 54 or other modules for providing communications with a wide-area computer network such as the Internet. The modem 54, which is an internal or external device, is connected to the system bus 23 by a serial port 46. It should be noted that the network connections are only examples and need not depict the exact configuration of the network, i.e., in reality there are other ways of establishing a connection of one computer to another by technical communication modules.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In various aspects, the systems and methods described in the present disclosure in terms of modules. The term "module" as used herein refers to a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module can also be implemented as a combination of the two, with certain functions facilitated by hardware alone, and other functions facilitated by a combination of hardware and software. In certain implementations, at least a portion, and in some cases, all, of a module can be executed on the processor of a general purpose computer (such as the one described in greater detail in FIG. 6 above). Accordingly, each module can be realized in a variety of suitable configurations, and should not be limited to any particular implementation exemplified herein.

In the interest of clarity, not all of the routine features of the aspects are disclosed herein. It will be appreciated that in the development of any actual implementation of the present disclosure, numerous implementation-specific decisions must be made in order to achieve the developers specific goals, and that these specific goals will vary for different implementations and different developers. It will be appreciated that such a development effort might be complex and time-consuming, but would nevertheless be a routine undertaking of engineering for those of ordinary skill in the art having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for managing access to computer resources, the method comprising:
   receiving a request, from a client process, for performing an operation on a computer resource, including receiving the request by a kernel of an operating system for creating a separate process to perform the requested operation on the computer resource;
   obtaining, by a resource manager, metadata of the computer resource and data relating to operations requested by other client processes on the computer resource;
   determining, based on the metadata, whether the requested operation alters the metadata and violates an isolation condition of the computer resource;
   determining, based on the data relating to the operations requested by the other client processes, whether the requested operation distorts the operations requested by the other client processes; and
   performing the requested operation on the resource upon detecting that the requested operation does not: alter the metadata, violate the isolation condition of the computer resource, and distort the operations requested by the other client processes.

2. The method of claim 1, further comprising:
   obtaining, by a resource manager, security policies for the client process to perform the requested operation on the computer resource;
   determining, based on the security policies, whether the requested operation violates the rights of the client process; and
   performing the requested operation on the resource upon detecting that the requested operation does not violate rights of the client process.

3. The method of claim 1, wherein the metadata comprise at least one of a first range of location on an data medium, a second range of location in a memory, an identifier, a name, integrity data, reservation data, and data on execution methods of the resource.

4. The method of claim 1, wherein the data comprise at least one of a start time of the other operations, a current status of the other operations, a current type of the operations, and communications between the other client processes.

5. The method of claim 1, wherein the isolation condition is related to isolating the computer resource from other resources and client processes.

6. The method of claim 1, further comprising storing an application on a disk in a set of logically isolated sections, at least a portion of the isolated sections comprising computer resources.

7. The method of claim 6, further comprising providing multiple resource managers to manage the computer resources independently.

8. A system for managing access to computer resources, the system comprising:
   a hardware processor configured to:

receive a request, from a client process, for performing an operation on a computer resource, including receiving the request by a kernel of an operating system for creating a separate process to perform the requested operation on the computer resource;

obtain, by a resource manager, metadata of the computer resource and data relating to operations requested by other client processes on the computer resource;

determine, based on the metadata, whether the requested operation alters the metadata and violates an isolation condition of the computer resource;

determine, based on the data relating to the operations requested by the other client processes, whether the requested operation distorts the operations requested by the other client processes; and perform the requested operation on the resource upon detecting that the requested operation does not: alter the metadata, violate the isolation condition of the computer resource, and distort the operations requested by the other client processes.

9. The system of claim 8, wherein the processor is further configured to:

obtain, by a resource manager, security policies for the client process to perform the requested operation on the computer resource;

determine, based on the security policies, whether the requested operation violates the rights of the client process; and perform the requested operation on the resource upon detecting that the requested operation does not violate rights of the client process.

10. The system of claim 8, wherein the metadata comprise at least one of a first range of location on an data medium, a second range of location in a memory, an identifier, a name, integrity data, reservation data, and data on execution methods of the resource.

11. The system of claim 8, wherein the data comprise at least one of a start time of the other operations, a current status of the other operations, a current type of the operations, and communications between the other client processes.

12. The system of claim 8, wherein the isolation condition is related to isolating the computer resource from other resources and client processes.

13. The system of claim 8, wherein the processor is further configured to store an application on a disk in a set of logically isolated sections, at least a portion of the isolated sections comprising computer resources.

14. The system of claim 13, wherein the processor is further configured to provide multiple resource managers to manage the computer resources independently.

15. A non-transitory computer-readable storage medium having a computer program product stored thereon, the computer program product comprising computer-executable instructions for managing access to computer resources, the instructions configured for:

receiving a request, from a client process, for performing an operation on a computer resource, including receiving the request by a kernel of an operating system for creating a separate process to perform the requested operation on the computer resource;

obtaining, by a resource manager, metadata of the computer resource and data relating to operations requested by other client processes on the computer resource;

determining, based on the metadata, whether the requested operation alters the metadata and violates an isolation condition of the computer resource;

determining, based on the data relating to the operations requested by the other client processes, whether the requested operation distorts the operations requested by the other client processes; and performing the requested operation on the resource upon detecting that the requested operation does not: alter the metadata, violate the isolation condition of the computer resource, and distort the operations requested by the other client processes.

16. The computer-readable storage medium of claim 15, further comprising instructions for:

obtaining, by a resource manager, security policies for the client process to perform the requested operation on the computer resource;

determining, based on the security policies, whether the requested operation violates the rights of the client process; and performing the requested operation on the resource upon detecting that the requested operation does not violate rights of the client process.

17. The computer-readable storage medium of claim 15, wherein the metadata comprise at least one of a first range of location on an data medium, a second range of location in a memory, an identifier, a name, integrity data, reservation data, and data on execution methods of the resource.

18. The computer-readable storage medium of claim 15, wherein the data comprise at least one of a start time of the other operations, a current status of the other operations, a current type of the operations, and communications between the other client processes.

19. The computer-readable storage medium of claim 15, wherein the isolation condition is related to isolating the computer resource from other resources and client processes.

20. The computer-readable storage medium of claim 15, further comprising instructions for:

storing an application on a disk in a set of logically isolated sections, at least a portion of the isolated sections comprising computer resources; and providing multiple resource managers to manage the computer resources independently.

* * * * *